United States Patent
McCormick et al.

(10) Patent No.: US 10,476,745 B1
(45) Date of Patent: Nov. 12, 2019

(54) INFRASTRUCTURE-AGNOSTIC NETWORK-LEVEL VISIBILITY AND POLICY ENFORCEMENT FOR CONTAINERS

(71) Applicant: Illumio, Inc., Sunnyvale, CA (US)

(72) Inventors: Thomas Michael McCormick, San Jose, CA (US); Daniel Richard Cook, San Jose, CA (US); Rupesh Kumar Mishra, Santa Clara, CA (US); Matthew Kirby Glenn, Mountain View, CA (US); Paul James Kirner, Palo Alto, CA (US); Mukesh Gupta, Fremont, CA (US); Juraj George Fandli, Campbell, CA (US)

(73) Assignee: Illumio, Inc., Sunnyvale, CA (US)

( * ) Notice: Subject to any disclaimer, the term of this patent is extended or adjusted under 35 U.S.C. 154(b) by 0 days.

(21) Appl. No.: 15/995,080

(22) Filed: May 31, 2018

(51) Int. Cl.
*H04L 12/24* (2006.01)
*H04L 29/06* (2006.01)
*H04L 12/26* (2006.01)
*H04L 29/08* (2006.01)

(52) U.S. Cl.
CPC ........ *H04L 41/0893* (2013.01); *H04L 43/062* (2013.01); *H04L 63/0263* (2013.01); *H04L 67/1002* (2013.01)

(58) Field of Classification Search
CPC ............... H04L 41/0893; H04L 43/062; H04L 63/0263; H04L 67/1002
See application file for complete search history.

(56) References Cited

U.S. PATENT DOCUMENTS

| 10,025,924 | B1* | 7/2018 | Vagin | G06F 21/53 |
|---|---|---|---|---|
| 2015/0052262 | A1* | 2/2015 | Chanda | H04L 61/2015 709/245 |
| 2015/0052522 | A1* | 2/2015 | Chanda | G06F 9/455 718/1 |
| 2016/0255077 | A1* | 9/2016 | Lee | H04L 63/0823 713/159 |
| 2017/0293762 | A1* | 10/2017 | Karhunen | G06F 9/547 |
| 2018/0198824 | A1* | 7/2018 | Pulapaka | H04L 63/20 |
| 2018/0293394 | A1* | 10/2018 | Gunda | G06F 21/53 |
| 2019/0052532 | A1* | 2/2019 | Chen | H04L 41/0896 |

* cited by examiner

*Primary Examiner* — Arvin Eskandarnia
(74) *Attorney, Agent, or Firm* — Fenwick & West LLP

(57) ABSTRACT

An enforcement mechanism on an operating system instance enforces a segmentation policy on a container. A configuration generation module executing in a host namespace of the operating system instance receives management instructions from a segmentation server for enforcing the segmentation policy on a container. The configuration generation module executes in the host namespace to configure a traffic control and monitoring module in a container namespace associated with the container. The traffic control and monitoring module in the container namespace controls and monitors communications to and from the container in accordance with its configuration. By executing a configuration generation module in the host namespace to configure traffic control and monitoring module in the container namespace, the enforcement mechanism beneficially enables robust and lightweight enforcement in a manner that is agnostic to different containerization protocols.

20 Claims, 3 Drawing Sheets

INFRASTRUCTURE-AGNOSTIC NETWORK-LEVEL VISIBILITY AND POLICY ENFORCEMENT FOR CONTAINERS

BACKGROUND

Technical Field

This application relates to managing a segmentation policy that controls communications between workloads.

Description of Related Art

A segmentation policy comprises a set of rules that control which workloads may communicate on a network and may place restrictions on how such workloads may communicate. In modern computer networks, workloads may execute on physical servers or may execute in various virtual environments such as virtual machines, containers, or jails. Traditional segmentation systems may fail to provide the desired level of control for workloads in virtualized environments because different types of virtualized environments provide different levels of visibility and control of their respective networking layers. As a result traditional segmentation systems may fail to provide the intended security.

SUMMARY

A system, non-transitory computer-readable storage medium, and method enforces a segmentation policy on a workload executing in a container. A container executes on a host operating system of a processing device. Host processes of the operating system instance are associated with a host namespace and the container is associated with a container namespace. Here, processes of the container are isolated from processes executing outside of the container namespace. Furthermore, the container namespace and the host namespace share a kernel of the operating system instance. A configuration generation module executes in the host namespace of the host operating system to generate management instructions for controlling communications to and from the container. The configuration generation module configures a traffic control and monitoring module executing within the container namespace to carry out the management instructions. The traffic control and monitoring module executing within the container namespace operates to block communications to and from the container that are not permitted by the management instructions and to permit communications to and from the container that are permitted by the management instructions.

In an embodiment, configuring the traffic control and monitoring module comprises executing a command to select the container namespace and executing a utility program to configure tables of an operating system firewall associated with the container namespace.

In an embodiment, a container orchestration module obtains a label set for the container that comprises one or more labels associated with the container. The container orchestration module transmits the label set to a segmentation server, which generates the management instructions for the container based on the label set. Furthermore, a globally unique workload identifier for the container may be received form the segmentation server in response to transmitting the label set to the segmentation server. The host operating system stores an association between the globally unique workload identifier and the container namespace. Upon obtaining the management instructions, the operating system instance maps the globally unique workload identifier referenced in the management instructions to the container namespace to which it applies.

In an embodiment, communications associated with the container namespace are monitored by the traffic control and monitoring module executing within the container namespace to identify traffic flows associated with the container. A traffic flow reporting module executing in the host namespace obtains the traffic flows associated with the container, and transmits the obtained traffic flows to a segmentation server. The segmentation server may generate or update policy based on the observed traffic flows.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

An enforcement mechanism on an operating system instance enforces a segmentation policy on a container comprising a workload in a containerized operating environment. A configuration generation module executing in a host namespace of the operating system instance receives management instructions from a segmentation server for enforcing the segmentation policy on the container. The configuration generation module executes in the host namespace to configure a traffic control and monitoring module in a container namespace associated with the container. The traffic control and monitoring module in the container namespace controls and monitors communications to and from the container in accordance with its configuration. By executing a configuration generation module in the host namespace to configure traffic control and monitoring module in the container namespace, the enforcement mechanism beneficially enables robust and lightweight enforcement in a manner that is agnostic to different containerization protocols.

Figure 1:
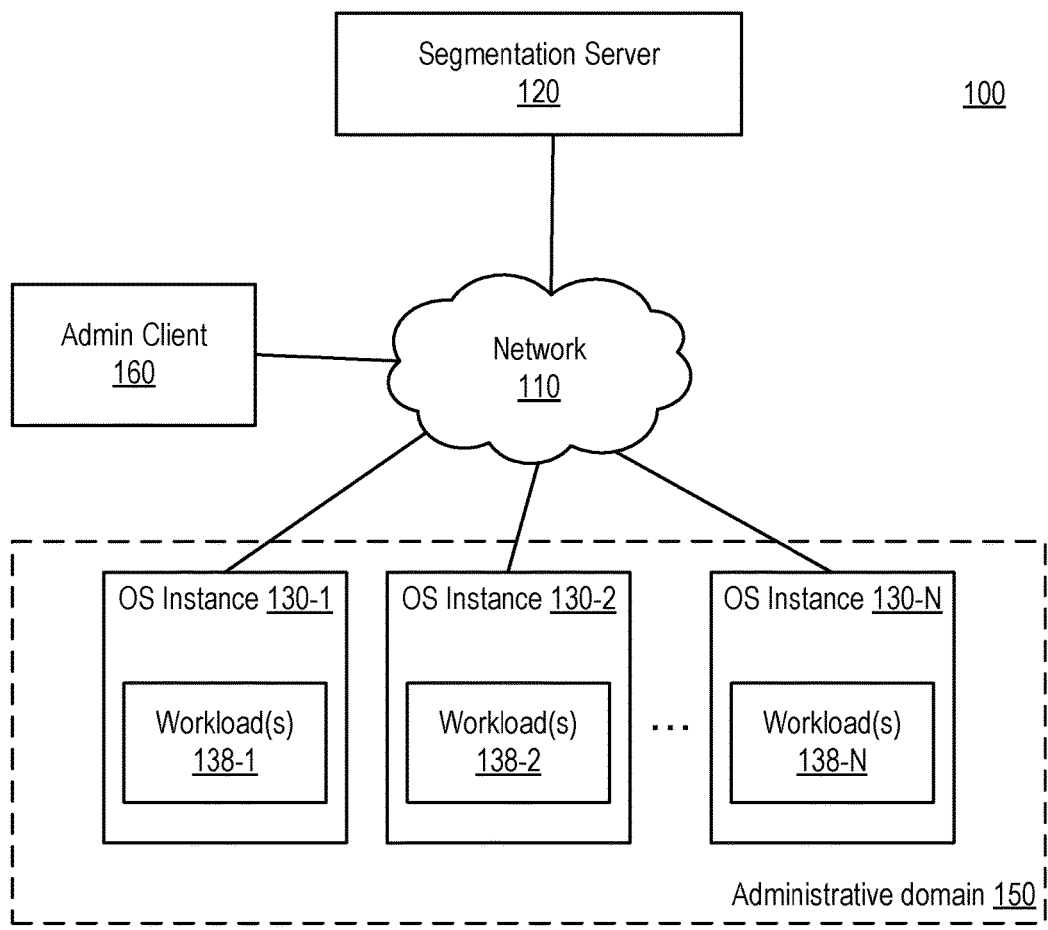
FIG. 1 is a high-level block diagram illustrating an environment for managing a segmentation policy, according to one embodiment.

FIG. 1 is a high-level block diagram illustrating a networked computing environment 100. The networked computing environment 100 includes a segmentation server 120, a network 110, an administrative client 160, and an administrative domain 150 that includes a plurality of operating system (OS) instances 130 (e.g., OS instances 130-1, 130-2, . . . , 130-N). The administrative domain 150 can correspond to an enterprise such as, for example, a service provider, a corporation, a university, or a government agency under control of the segmentation server 120.

The network 110 represents the communication pathways between the segmentation server 120, the administrative client 160, and the OS instances 130. In one embodiment, the network 110 uses standard communications technologies and/or protocols and can include the Internet. In another embodiment, the entities on the network 110 can use custom and/or dedicated data communications technologies.

The OS instances 130 comprise instances of an operating system executing on one or more computing devices. An OS instance 130 may execute directly on a physical machine or on a virtual machine that executes on one or more computing devices. A single physical or virtual machine may operate a single OS instance 130 or may operate multiple OS instances 130 The OS instances 130 each execute one or more workloads 138 (e.g., one or more workloads 138-1, one or more workloads 138-2, etc.). The workloads 138 comprise independently addressable computing units for performing computing tasks. A workload 138 may comprise, for example, an application or application component, a process, a container, or other sub-component thereof executing on the OS instance 130. In some instances, an OS instance 130 may operate only a single workload 138. In other instances, an OS instance 130 may operate multiple workloads 138 that may be independently addressable and may perform different independent computing functions. The workloads 138 on the OS instances 130 may communicate with other workloads 138 on different OS instances 130 within the administrative domain 150 to perform various tasks.

The segmentation server 120 is a computer (or set of computers) that obtains and stores information about the OS instances 130 on the network 120 and the workloads 138 executing on the OS instances 130. The segmentation server 120 manages a segmentation policy for the administrative domain 150 that regulates communications between workloads 138 within the administrative domain 150. In an embodiment, the segmentation policy is set forth using permissive rules that specify the communications that are permitted. The segmentation policy is enforced by blocking any communications that are not expressly permitted by the rules. For example, the segmentation policy includes a set of rules specifying whether certain workloads 138 are allowed to provide services to or receive services from other workloads 138, and may place restrictions on how those workloads 138 are allowed to communicate when providing or consuming the services. For example, a segmentation policy may include a rule specifying that a workload 138-1 operating on an OS instance 130-1 is allowed to provide a particular service to a workload 138-2 operating on an OS instance 130-2. Absent other rules, the workload 138-1 will thus be blocked from providing the service to a workload 138-N operating on an OS instance 130-N. The rule may furthermore specify the type of service that the workload 138-1 is allowed to provide to workload 138-2 (e.g., a database service, a web service, etc.). Additionally, the rule may specify how the workloads 138-1, 138-2 may communicate when providing this service (e.g., using encrypted communication only, using authenticated communication only, etc.). A rule may be specified as a plurality of fields including a "service," a "provided-by" portion that identifies one or more workloads 138 that is permitted to provide the service (which may be specified by a port number), a "used-by" portion that identifies one or more workloads 138 that is permitted to use the service provided by the workloads 138 in the "provided-by portion," and a "rule function" that may place one or more restrictions on the communications between the workloads 138 while facilitating the service.

In an embodiment, the segmentation server 120 may assign one or more labels to each workload 138 that define one or more high-level characteristics of the workload 138. Labels may be multi-dimensional. Here, a label may comprise a "dimension" (a high-level characteristic) and a "value" (the value of that high-level characteristic). For example, one possible label dimension may specify a "role" of the workload 138 and may have values such as "web," "API," or "database" specifying the role of the workload 138 within the administrative domain 150. In another example, a label dimension may specify a "location" of the workload 138 and may have values such as "United States" or "Europe." Workloads 138 may also be labeled based on a user group of a user that is logged into the workload 138 or the corresponding OS instance 130 on which the workload 138 executes. For example, a workload 138 may have a label with a dimension "user group" and a value "managers." Each workload 138 may be assigned labels for one or more dimensions but each workload 138 does not necessarily have a label assigned for every possible dimension. For example, a workload 138 may have a label specifying its location but may not necessarily have a label specifying its role. The set of labels assigned to a particular workload 138 may be referred to herein as a label set for the workload 138.

A logical management model specifying the number and types of dimensions available and those dimensions' possible values may be configurable. In one embodiment, the logical management model includes the following dimensions and possible values, as shown in Table 1:

TABLE 1

Example of logical management model

| Dimension | Meaning (M), Values (V) |
| --- | --- |
| Role | M: The role of the managed server within the administrative domain.<br>V: web, API, database |
| Environment | M: The lifecycle stage of the managed server.<br>V: production, staging, development |
| Application | M: The logical application (higher-level grouping of managed servers) to which the managed server belongs.<br>V: trading, human resources |
| Line of Business | M: The business unit to which the managed server belongs.<br>V: marketing, engineering |
| Location | M: The location of the managed server. Can be physical (e.g., country or geographical region) or logical (e.g., network). Physical is particularly useful for expressing geographic compliance requirements.<br>V: US or EU (physical), us-west-1 or us-east-2 (logical) |
| User Group | M: The user group containing the user logged onto the managed server.<br>V: Engineers, Contractors, Managers, System Administrators |

The segmentation server 120 may utilize label sets to enable the segmentation policy to be defined at a high level of abstraction by specifying rules based on label sets. Thus, a rule of the segmentation policy may identify a group of workloads 138 to which a portion of the rule is applicable by referencing one or more label sets. For example, a rule may specify that a first group of workloads 138 with a label set A may provide a service B to a second group of workloads 138 with a label set C. Rules may be specified for groups of workloads 138 identified using only a subset of the label dimensions.

The segmentation server 120 may retain a repository storing information about the OS instances 130 and the workloads 138 managed by the segmentation server 120. For example, the segmentation server 120 may store, for each OS instance 130, an OS instance identifier that uniquely identifies the OS instance 130, workload identifiers for workloads 138 associated with the OS instance 138, and membership information indicating one or more groups of workloads 138 to which each workload 138 belong (e.g., as defined by the respective label sets for the workloads 138).

Table 2 illustrates an example of information stored by the segmentation server 120. Here, the "ID" represents the OS instance identifier for each OS instance 130. The workload ID(s) represent the workload identifier for the workload(s) 138 executing on each OS instance 130. If only a single workload executes on a particular OS instance 130, the workload ID may be synonymous with the OS instance ID (e.g., in the case of ID1 and IDn). If more than one workload 138 executes on a given OS instance 130, the workload ID may include the OS instance ID in combination with a sub-identifier for the workload 138 (e.g., in the case of ID2). The sub-identifier may comprise, for example, an IP address or other identifier that uniquely identifies the workload 138 when taken in combination with the identifier for the OS instance 130. The memberships represent groups to which one or more workloads 138 executing on the OS instance 130 belongs. Each group may correspond to a unique label set involving one or more dimensions.

TABLE 2

Example of a Repository Table

| OS Instance ID | Workload ID(s) | Memberships |
| --- | --- | --- |
| ID1 | ID1 | A, C, D |
| ID2 | ID2 + subID1 | B, C |
|  | ID2 + subID2 | D |
| . | . | . |
| . | . | . |
| . | . | . |
| IDn | IDn | B, D, E, F |

Instead of enforcing the segmentation policy at a centralized device, the segmentation policy is instead enforced by at least a subset of the OS instances 130. To enable enforcement of the segmentation policy, the segmentation server 120 generates a set of management instructions and distributes the management instructions to the OS instances 130. The management instructions include the rules controlling communications between different groups of workloads 138 (e.g., specified by their label sets or directly by an identifier of the workload 138) and membership information indicating workloads 138 belonging to each group (e.g., which workloads 138 have certain label sets). For efficiency of distribution, the segmentation server 120 may send different management instructions to different OS instances 130 so that each OS instance 130 gets only the management instructions relevant to its operation. Here, the segmentation server 120 may determine which rules are relevant to a given OS instance 130 and distribute the relevant rules to that OS instance 130. A rule may be deemed relevant to a particular OS instance 130 if that OS instance 130 executes one or more workloads 138 that belongs to a group (defined by one or more label sets) referenced by the rule. The segmentation server 120 may furthermore determine which membership information is relevant to each OS instance 130 and distribute the relevant membership information to each respective OS instance 130. Here, membership information may be relevant to a particular OS instance 130 if it defines membership of a group referenced by a rule deemed relevant to the particular OS instance 130. Further details of a segmentation system for controlling communications between OS instances 130 based on labels is described in U.S. Patent Application Publication No. 2014/0373091 entitled "Distributed Network Security Using a Logical Multi-Dimensional Label-Based Policy Model," to Paul J. Kirner, et al., which is incorporated by reference herein.

In an embodiment, the segmentation server 120 automatically generates or updates a segmentation policy based on monitored traffic flows between the workloads 138. For example, the segmentation server 120 may observe which workloads 138 communicate with each other under a very permissive segmentation strategy and the manner in which they communicate under normal conditions. The segmentation server 120 may then automatically generate a more restrictive segmentation policy that limits communications to those consistent with the observed communications. In this manner, anomalous communications that may be indicative of malicious behavior may be blocked. In other embodiments, the segmentation server 120 may generate the segmentation policy based on monitored traffic flows according to different segmentation strategies.

The administrative client 160 comprises a computing device that may be operated by an administrator of the administrative domain 150 being managed by the segmentation server 120. The administrative client 160 may execute an interface (e.g., via an application or web browser) that enables the administrator to interact with the segmentation server 120 to configure or view the segmentation policy. The interface may furthermore enable the administrator to obtain various information about the OS instances 130 and workloads 138 on the network 120 and view traffic flows between the workloads 138.

Figure 2:
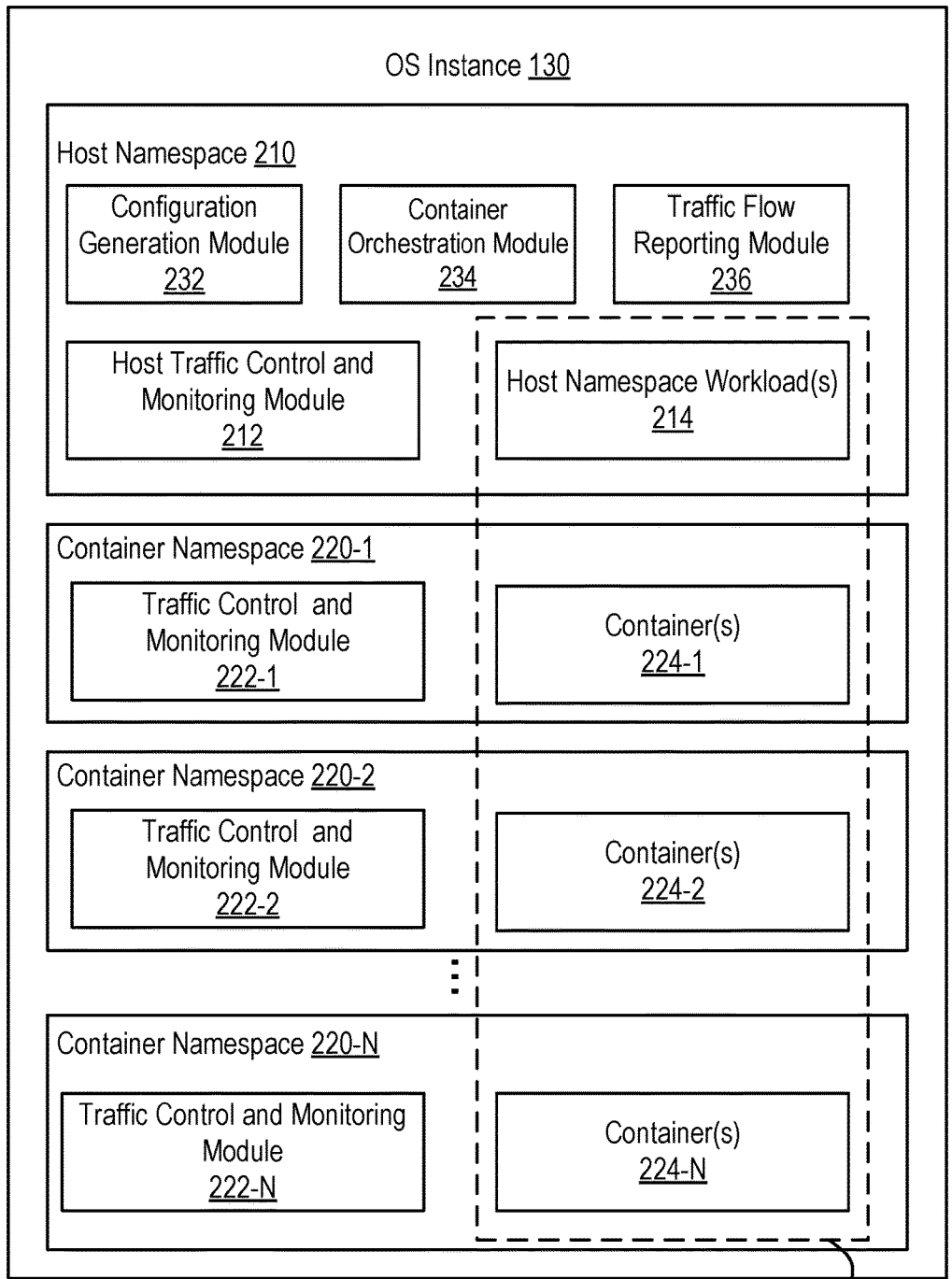
FIG. 2 is a block diagram illustrating an example embodiment of an operating system instance.

FIG. 2 illustrates an example embodiment of an OS instances 130. The OS instance 130 is organized into multiple namespaces including a host namespace 210 and one or more container namespaces 220. A namespace comprises an abstraction of global system resources that causes a global system resource to appear to processes within a namespace as if the processes in the namespace have access to an isolated instance of the global system resource. Changes to a global system resource by a process in a namespace are visible to other processes within the namespace but are invisible to processes outside the namespace. The operating system instance 130 separately manages processes or objects in different namespaces to avoid naming collisions. Thus, processes with the same name may operate concurrently in different namespaces. In an embodiment, the host namespace 210 comprises a primary network namespace for processes associated with system level functions of the OS instance 130. Thus, non-containerized processes of the OS instance 130 generally operate in the host namespace 210. One or more workloads 138 can also operate in the host namespace 210 as one or more host namespace workloads 214.

A container namespace 220 is a network namespace associated with one or more containers 224. One or more containers 224 may execute in each of the respective container namespaces 220. Here, a container 224 is a set of processes executing within a user space of a container namespace 220 that is shared with the kernel of the OS instance 130 (i.e., the container 224 does not have a separate kernel). A container 224 may be defined by a combination of its kernel features, control groups, and its namespace. The container namespaces 220 referenced herein may refer to network namespaces on LINUX operating systems or compartments on WINDOWS operating systems. Containers 224 are useful to provide isolation between different virtual hosting environments executing on the same OS instance 130. For example, the processes associated with a first container 224-1 in the first container namespace 220-1 have visibility only into the resources within the first container namespace 220-1 and are isolated from resources outside the first container namespace 220-1. Thus, a first container 224-1 does not have visibility into resources associated with the container namespaces 220-2, . . . , 220-N. In an administrative domain 150, containers 224 may be utilized to provide isolation between different types of applications. For example, a first container 224-1 may execute processes associated with database applications and a second container 224-2 may execute processes associated with web applications. 224-2 may execute processes associated with web applications. An example of a container 224 may comprise, for example, DOCKER or CONTAINERD.

The one or more host namespace workloads 214 and the one or more containers 224 represent specific types of the workloads 138 described above. Thus, a host namespace workload 214 and a container 224 may respectively be assigned labels and may be controlled by rules in the same manner as the generic workloads 138 described above.

The host traffic control and monitoring module 212 comprises a low-level network firewall or security engine that controls and monitors incoming and outgoing traffic associated with each host namespace workload 214 executing in the host namespace 210 of the OS instance 130. The host traffic control and monitoring module 212 operates to filter incoming and outgoing packets based on a table specifying packets that should be blocked or permitted based on a source and/or destination identifier associated with a packet (e.g., an IP address). Thus, the host traffic control and monitoring module 212 operates to restrict communications to or from a host namespace workload 214. For example, the host traffic control and monitoring module 212 may permit a particular host namespace workload 214 to communicate with a limited set of workloads 138 on other OS instances 130, and may block other communications. Furthermore, the host traffic control and monitoring module 212 may place restrictions on how a host namespace workload 214 in the host namespace 210 is permitted to communicate. Thus, for a particular host namespace workload 214, the host traffic control and monitoring module 212 may enable the host namespace workload 214 to communicate using only encrypted protocols and block any unencrypted communications. The host traffic control and monitoring module 212 furthermore monitors incoming traffic having a destination address corresponding to a host namespace workload 214 and monitors outgoing traffic sent by the host namespace workload 214. The host traffic control and monitoring module 212 may send monitored traffic information to the traffic flow reporting module 236 described below.

The container traffic control and monitoring modules 222 each operate in a respective container namespace 220. For example, a first container traffic control and monitoring module 222-1 operates in a first container namespace 220-1 associated with a first group of one or more containers 224-1, and a second container traffic control and monitoring module 222-2 operates in a second container namespace 220-2 associated with a second group of one or more containers 224-2. Each container traffic control and monitoring module 222 operates similarly to the host traffic control module 212 described above (e.g., as a low-level network firewall or security engine) to control and monitor incoming and outgoing traffic associated with each of the respective containers 224 in the corresponding container namespace 220.

In an embodiment, the traffic control and monitoring modules 212, 222 may each comprise an operating system-level firewall such as a Linux kernel firewall based on Netfilter modules or a Windows firewall based on a Windows Filtering Platform. Furthermore, the traffic control and monitoring modules 212, 222 may comprise an Internet Protocol security (IPsec) engine that controls encryption and decryption of packets sent to and from the respective host workloads 214, 224. In an embodiment, the traffic control and monitoring modules 212, 222 each operate in the kernel space of the OS instance 130.

Various system modules execute in the host namespace 210 including a configuration generation module 232, a container orchestration module 234, and a traffic flow reporting module 236. The configuration generation module 232 receives the management instructions from the segmentation server 120 and translates the management instructions from a high level set of instructions to a low level configuration of the traffic control and monitoring modules 212, 222. For example, the configuration generation module 232 obtains the relevant rules and relevant membership information in the received management instructions and identifies the specific host namespace workloads 214 referenced by the label sets specified in the rules. The configuration generation module 232 then configures the host traffic control and monitoring module 212 to control traffic to and from the host namespace workloads 214 to enforce the management instructions. The configuration generation module 232 also identifies the specific containers 224 referenced by the label sets specified in the rules and similarly configures the respective container traffic control and monitoring modules 222 to control traffic to and from the respective containers to enforce the management instructions. In an embodiment, the configuration generation module 232 includes an iptables executable that executes to program respective filtering tables of the traffic control and monitoring modules 212, 222.

In an embodiment, the configuration generation module 232 switches between namespaces in order to configure the traffic control and monitoring modules 212, 222 using an operating system command for changing namespaces. For example, to configure a traffic control and monitoring module 222 for a particular container namespace 220, the configuration generation module 232 may execute a namespace selection command that includes an identifier for the selected namespace 220. The configuration generation module 232 then executes a configuration command to program the filtering tables in the selected namespace in accordance with the management instructions. For example, in the Linux operating environment, the configuration generation module 232 executes a SetNS(X) command, where X is the namespace identifier. The configuration generation module 232 then execute the iptables process to cause the configuration generation module 232 to program filtering tables of the container traffic control module 222 associated with a particular container 224 in the namespace 220. After configuring the container traffic control module 222, the configuration generation module 232 may re-execute the namespace selection command referencing an identifier for a different container namespace 220 or return to the host namespace 210.

The traffic flow reporting module 236 obtains traffic information from each of the traffic control and monitoring modules 212, 222 indicating traffic to and from each of the workloads 214, 224 and reports the detected traffic to the segmentation server 120. For example, the traffic information may include an identifier for the workload 214, 224 in accordance with its respective namespace 210, 220, an identifier for the namespace 210, 220, and information about the type of data being communicated. The traffic flow reporting module 236 may determine a unique identifier associated with the workload 214, 224 from the received workload identifier and the namespace identifier.

The container orchestration module 234 manages the containers 224. For example, the container orchestration module 234 may cause creation of a new container 224 in a new container namespace 220 or in an existing container namespace 220. The container orchestration module 234 may furthermore remove containers 224 from the OS instance 130. In an embodiment, the container orchestration module 234 maintains a repository with identifying information for each container 224, its respective container namespace 220, and its respective labels. In one embodiment, upon creating a new container 224, the container orchestration module 234 generates labels for the container 224 and sends the labels to the segmentation server 120. Alternatively, the labels may be generated from the containers 224 themselves or from the operating system file system or other environment variables. The segmentation server 120 may then generate a globally unique workload identifier for the container 224 and send the globally unique workload identifier to the container orchestration server 234. The container orchestration module 234 stores the globally unique workload identifier in the repository to enable it to uniquely identify the container 224. An example of a container orchestration module 234 may comprise for example, OPENSHIFT, KUBERNETES, or MESOS.

Advantageously, the configuration generation module 232 operates in the host namespace 210 but injects configurations into the respective container traffic control and monitoring modules 222 (e.g., by programming respective tables) of the respective container namespaces 220. This configuration is preferable over an architecture in which a separate configuration generation module 232 executes in each of the containers 224 because it enables the containers 224 to remain lightweight. Thus, each container 224 may execute only the processes necessary for a specific application in accordance with their intended operation and undesirable overhead may be avoided. Furthermore, this architecture is beneficial because it is agnostic to the particular type of container system being used, and thus works for any type of container regardless of the specific network protocols or file systems it employs. For example, the described architecture is compatible with container systems in which the containers 224 do not have full file systems or the standard packages (e.g., an iptables executable) generally utilized to generate a configuration of the traffic control and monitoring module 222.

The described configuration is also preferable over an architecture in which the host traffic control and monitoring module 212 directly controls traffic into and out of the containers 224 because the host traffic control module 212 may not have sufficient visibility into the containers 224 to robustly identify and filter traffic in accordance with the segmentation policy. For example, depending on the container architecture being used, a traffic control and monitoring module operating solely in the host namespace 210 would have to be specifically configured to accommodate a wide variety of different protocols and configurations associated with different types of containers 224 and may still be unable to identify all relevant packet headers required for enforcement. The described solution is beneficially agnostic to the particular container networking technology being used in the containers 224 and does not require any assumptions about the configurations of the containers 224. By executing the configuration generation module 232 in the host namespace 210 and generating configurations of the container traffic control and monitoring modules 222 in their respective container namespaces 220, the described solution can operate efficiently with any container architecture and can operate with low overhead and robust performance.

Figure 3:
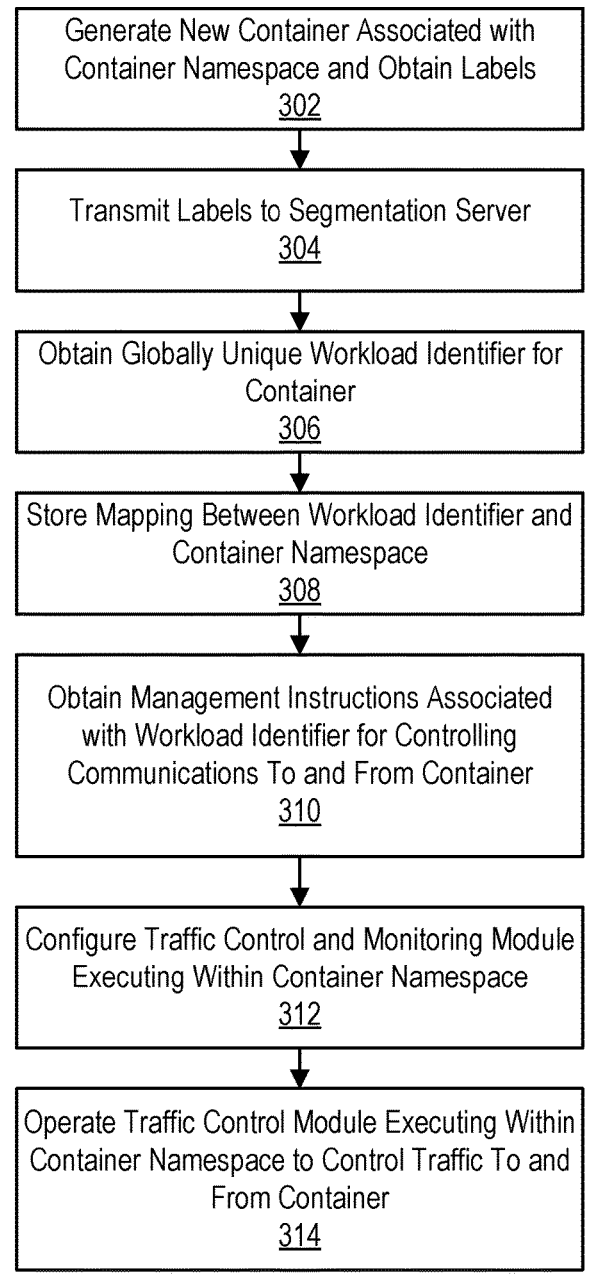
FIG. 3 is a flowchart illustrating an example embodiment of a process for enforcing a segmentation policy on a container.

FIG. 3 illustrates an example embodiment of a process for enforcing a segmentation policy on an OS instance 130 executing one or more containers 224. The container orchestration module 234 generates 302 a new container 224 associated with a container namespace 220 and obtains labels for the container 224. The container orchestration module 234 transmits 304 the labels to the segmentation server 120, which generates a globally unique workload identifier for the container 224. The container orchestration module 234 obtains 306 the workload identifier for the container 224 and stores 308 a mapping between the workload identifier and the container namespace 220. The configuration generation module 232 obtains management instructions relevant to the container 224 for controlling communications to and from the container 224. For example, the management instructions may include a set of rules referencing label sets to which the rules are applicable and membership information referencing workload identifiers (including the workload identifier for the container) for workloads having the label sets referenced in the rules. The configuration generation module 232 configures 310 the container traffic control and monitoring module 222 associated with the container 224 in the container namespace 220. The container traffic control and monitoring module 222 operates 312 in the container namespace 220 to control and monitor traffic to and from the container 224.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

The invention claimed is:

1. A method for enforcing a segmentation policy, the method comprising:
    executing a container on a host operating system of a processing device, wherein host processes of the host operating system are associated with a host namespace and the container is associated with a container namespace;
    obtaining, by a configuration generation module executing in the host namespace of the host operating system, management instructions for controlling communications to and from the container;
    configuring, by the configuration generation module, a traffic control and monitoring module executing within the container namespace to carry out the management instructions; and
    operating the traffic control and monitoring module executing within the container namespace to block communications to and from the container that are not permitted by the management instructions and to permit communications to and from the container that are permitted by the management instructions.

2. The method of claim 1, further comprising:
    obtaining a label set associated with the container from a container orchestration layer of the host operating system, the label set comprising one or more labels;
    transmitting the label set to a segmentation server, wherein the segmentation server generates the management instructions for the container based on the label set.

3. The method of claim 2, the further comprising:
    receiving, from the segmentation server, a globally unique workload identifier for the container in response to transmitting the label set to the segmentation server;
    storing, by the host operating system, an association between the globally unique workload identifier and the container namespace; and
    upon obtaining the management instructions, mapping the globally unique workload identifier referenced in the management instructions to the container namespace.

4. The method of claim 1, further comprising:
    monitoring communications associated with the container namespace to identify traffic flows associated with the container;
    obtaining, by a traffic flow reporting module executing in the host namespace, the traffic flows associated with the container; and
    transmitting, by the traffic flow reporting module, the obtained traffic flows to a segmentation server.

5. The method of claim 1, wherein configuring the traffic control and monitoring module comprises:
    executing a command to select the container namespace; and
    executing a utility program to configure tables of an operating system firewall associated with the container namespace.

6. The method of claim 1, wherein processes of the container are isolated from processes executing outside of the container namespace.

7. The method of claim 1, wherein the container namespace and the host namespace share a kernel of the operating system instance.

8. A non-transitory computer-readable storage medium storing instructions for enforcing a segmentation policy, the instructions when executed by a processor causing the processor to perform steps including:
    executing a container on a host operating system of a processing device, wherein host processes of the host operating system are associated with a host namespace and the container is associated with a container namespace;
    obtaining, by a configuration generation module executing in the host namespace of the host operating system, management instructions for controlling communications to and from the container;
    configuring, by the configuration generation module, a traffic control and monitoring module executing within the container namespace to carry out the management instructions; and
    operating the traffic control and monitoring module executing within the container namespace to block communications to and from the container that are not permitted by the management instructions and to permit communications to and from the container that are permitted by the management instructions.

9. The non-transitory computer-readable storage medium of claim 8, the instructions when executed further causing the processor to perform steps including:
    obtaining a label set associated with the container from a container orchestration layer of the host operating system, the label set comprising one or more labels;
    transmitting the label set to a segmentation server, wherein the segmentation server generates the management instructions for the container based on the label set.

10. The non-transitory computer-readable storage medium of claim 9, the instructions when executed further causing the processor to perform steps including:
    receiving, from the segmentation server, a globally unique workload identifier for the container in response to transmitting the label set to the segmentation server;
    storing, by the host operating system, an association between the globally unique workload identifier and the container namespace; and
    upon obtaining the management instructions, mapping the globally unique workload identifier referenced in the management instructions to the container namespace.

11. The non-transitory computer-readable storage medium of claim 8, the instructions when executed further causing the processor to perform steps including: monitoring communications associated with the container namespace to identify traffic flows associated with the container;
    obtaining, by a traffic flow reporting module executing in the host namespace, the traffic flows associated with the container; and
    transmitting, by the traffic flow reporting module, the obtained traffic flows to a segmentation server.

12. The non-transitory computer-readable storage medium of claim 8, wherein configuring the traffic control and monitoring module comprises:
    executing a command to select the container namespace; and
    executing a utility program to configure tables of an operating system firewall associated with the container namespace.

13. The non-transitory computer-readable storage medium of claim 8, wherein processes of the container are isolated from processes executing outside of the container namespace.

14. The non-transitory computer-readable storage medium of claim 8, wherein the container namespace and the host namespace share a kernel of the operating system instance.

15. A computing device for enforcing a segmentation policy, the computing device comprising:
    one or more processors; and
    a non-transitory computer-readable storage medium storing instructions that when executed by the one or more processors cause the one or more processors to perform steps including:
        executing a container on a host operating system of a processing device wherein host processes of the host operating system are associated with a host namespace and the container is associated with a container namespace;
        obtaining, by a configuration generation module executing in the host namespace of the host operating system, management instructions for controlling communications to and from the container;
        configuring, by the configuration generation module, a traffic control and monitoring module executing within the container namespace to carry out the management instructions; and
        operating the traffic control and monitoring module executing within the container namespace to block communications to and from the container that are not permitted by the management instructions and to permit communications to and from the container that are permitted by the management instructions.

16. The computing device of claim 15, the instructions when executed further causing the one or more processors to perform steps including:
    obtaining a label set associated with the container from a container orchestration layer of the host operating system, the label set comprising one or more labels;
    transmitting the label set to a segmentation server, wherein the segmentation server generates the management instructions for the container based on the label set.

17. The computing device of claim 16, the instructions when executed further causing the one or more processors to perform steps including:
    receiving, from the segmentation server, a globally unique workload identifier for the container in response to transmitting the label set to the segmentation server;
    storing, by the host operating system, an association between the globally unique workload identifier and the container namespace; and
    upon obtaining the management instructions, mapping the globally unique workload identifier referenced in the management instructions to the container namespace.

18. The computing device of claim 15, the instructions when executed further causing the one or more processors to perform steps including: monitoring communications associated with the container namespace to identify traffic flows associated with the container;
    obtaining, by a traffic flow reporting module executing in the host namespace, the traffic flows associated with the container; and
    transmitting, by the traffic flow reporting module, the obtained traffic flows to a segmentation server.

19. The computing device of claim 15, wherein configuring the traffic control and monitoring module comprises:
    executing a command to select the container namespace; and
    executing a utility program to configure tables of an operating system firewall associated with the container namespace.

20. The computing device of claim 15, wherein processes of the container are isolated from processes executing outside of the container namespace.

* * * * *